United States Patent
Inoue et al.

(10) Patent No.: US 8,868,878 B2
(45) Date of Patent: Oct. 21, 2014

(54) DISK ARRAY SYSTEM AND HARD DISK DRIVE EXPANSION METHOD THEREOF

(71) Applicants: Tetsuya Inoue, Odawara (JP); Hiroshi Suzuki, Sagamihara (JP); Satoru Yamaura, Odawara (JP); Takeki Okamoto, Odawara (JP); Yosuke Nakayama, Odawara (JP)

(72) Inventors: Tetsuya Inoue, Odawara (JP); Hiroshi Suzuki, Sagamihara (JP); Satoru Yamaura, Odawara (JP); Takeki Okamoto, Odawara (JP); Yosuke Nakayama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/740,356

(22) Filed: Jan. 14, 2013

(65) Prior Publication Data

US 2013/0132666 A1    May 23, 2013

Related U.S. Application Data

(63) Continuation of application No. 12/664,160, filed as application No. PCT/JP2009/006032 on Nov. 12, 2009, now Pat. No. 8,364,927.

(51) Int. Cl.
| | |
|---|---|
| *G06F 12/08* | (2006.01) |
| *G06F 5/06* | (2006.01) |
| *G06F 3/06* | (2006.01) |

(52) U.S. Cl.
CPC ............. *G06F 3/0601* (2013.01); *G06F 3/061* (2013.01); *G06F 3/0658* (2013.01); *G06F 3/0689* (2013.01)
USPC .................. 711/170; 712/112; 712/E12.019; 712/E12.084

(58) Field of Classification Search
USPC ................... 711/112, 170, E12.019, E12.084
See application file for complete search history.

(56) References Cited

U.S. PATENT DOCUMENTS

| | | |
|---|---|---|
| 6,098,119 A | 8/2000 | Surugucchi et al. |
| 2002/0199039 A1 | 12/2002 | Peterson |
| 2005/0008341 A1 | 1/2005 | Yada et al. |
| 2005/0108476 A1 | 5/2005 | Tanaka et al. |
| 2006/0026336 A1 | 2/2006 | Matsushige et al. |
| 2006/0179216 A1 | 8/2006 | Chikamichi |
| 2006/0187634 A1 | 8/2006 | Tanaka et al. |
| 2007/0116038 A1 | 5/2007 | Holt et al. |
| 2007/0174517 A1 | 7/2007 | Robillard et al. |

(Continued)

FOREIGN PATENT DOCUMENTS

| | | |
|---|---|---|
| CN | 1350295 A | 5/2002 |
| EP | 1 688 833 A2 | 8/2006 |

(Continued)

OTHER PUBLICATIONS

JP Office Action in JP App. No. 2012-504600, dated May 7, 2013.

(Continued)

*Primary Examiner* — Hal Schnee
(74) *Attorney, Agent, or Firm* — Mattingly & Malur, PC

(57) ABSTRACT

Even if an arbitrary hard disk drive is added, the hard disk drive is operated in a specific operation mode suited for that hard disk drive.

As triggered by attachment of a hard disk drive to a disk adapter, a processor operates the hard disk drive in a predetermined operation mode based on predetermined parameter information that has been prepared in advance. The hard disk drive stores, in advance, particular parameter information including information about the specific operation mode suited for operation. The processor reads the particular parameter information from the hard disk drive in the predetermined operation mode and operates the hard disk drive in the specific operation mode based on the particular parameter information.

8 Claims, 14 Drawing Sheets

| Transceiver No. | Link Speed | | Parameters | | | |
|---|---|---|---|---|---|---|
| | Low | High | A | B | C | •••• |
| 0 | 1 | 0 | 0 | 1 | 0 | •••• |
| 1 | 1 | 0 | 1 | 1 | 0 | •••• |
| ⋮ | ⋮ | ⋮ | ⋮ | ⋮ | ⋮ | •••• |
| n | 0 | 1 | 1 | 1 | 1 | ••• |

(56) References Cited

U.S. PATENT DOCUMENTS

| | | |
|---|---|---|
| 2007/0220204 A1 | 9/2007 | Nakajima et al. |
| 2008/0177906 A1 | 7/2008 | Suzuki et al. |
| 2011/0107002 A1 | 5/2011 | Jones et al. |

FOREIGN PATENT DOCUMENTS

| | | |
|---|---|---|
| EP | 1 622 036 B1 | 12/2007 |
| JP | 200090608 | 3/2000 |
| JP | 2005149173 | 6/2005 |
| JP | 2006-42179 A | 2/2006 |
| JP | 200642179 | 2/2006 |
| JP | 2006221271 | 8/2006 |
| JP | 2006235696 | 9/2006 |
| JP | 2009093445 | 4/2009 |

OTHER PUBLICATIONS

Chinese Office Action received in Chinese Application No. 200980160704.2 dated Jan. 6, 2014.

FIG.4

| Transceiver No. | Link Speed | | Parameters | | | |
|---|---|---|---|---|---|---|
| | Low | High | A | B | C | .... |
| 0 | 1 | 0 | 0 | 1 | 0 | .... |
| 1 | 1 | 0 | 1 | 1 | 0 | .... |
| ⋮ | ⋮ | ⋮ | ⋮ | ⋮ | ⋮ | .... |
| n | 0 | 1 | 1 | 1 | 1 | .... |

DISK ARRAY SYSTEM AND HARD DISK DRIVE EXPANSION METHOD THEREOF

CROSS-REFERENCE

This is a continuation application of U.S. Ser. No. 12/664,160, filed on Dec. 11, 2009. This application claims priority from National Stage PCT/JP2009/006032, filed Nov. 12, 2009. The entire disclosures of all of these applications are hereby incorporated by reference.

TECHNICAL FIELD

The present invention relates to a disk array system including a disk unit, to which a hard disk drive can be added, and a disk controller. In particular, the present invention is related to a disk array system and hard disk drive expansion method thereof, relating a technique of improving quality of signals from and to a hard disk drive added to a disk unit.

BACKGROUND ART

In recent years, there has been a demand regarding disk array systems for realization of high performance, high capacity, downsizing and so on. Especially, in order to realize the high performance it is necessary to improve processing speed and interface speed of each device. The improvement of the interface speed means to increase signal frequency on transmission lines. If the signal frequency on transmission lines increases as above, signal loss will increase and the influence of signal reflection noises on parts where impedance mismatch occurs will increase, thereby causing errors at a signal transceiver. Therefore, concerning prior disk array systems, it is necessary to investigate the causes of the errors at the signal transceiver and to take necessary measures.

Regarding the prior disk array systems, the interface speed of a hard disk drive on a disk unit is 4 Gbps, but the interface speed of the next generation model will reach to 6 Gbps, which results in an increase in the signal frequency. If the frequency increases in this way, signal loss on transmission lines will increase as mentioned above and the signal reflection noises caused by impedance mismatch will increase, thereby increasing the influence on degradation of the signal quality. As a result, the probability of error occurrence will increase. Therefore, with the prior disk array systems, the signal quality that satisfies a specified error rate can be secured by setting parameters, such as amplitude and pre-emphasis, to each port of a transmitter for an expander contained in the disk unit (referring to Patent Literature 1).

CITATION LIST

Patent Literature

[PTL 1]
Japanese Patent Application Publication No. 2006-042179

SUMMARY OF INVENTION

Technical Problem

However, the signal quality, which satisfies the specified error rate, cannot be obtained unless appropriate parameters are also set to a transceiver of an expander and a transceiver of a hard disk drive, because the interface speed of a disk array system for the next generation model will reach to 6 Gbps. In consideration of the fact that hard disk drives of different models have different characteristics and the wiring length varies depending on the location where a hard disk drive is mounted in the disk unit, it is necessary to set parameters suited for each location and each hard disk drive model to the transceiver(s) of each expander or hard disk drive (or both of them).

Also, because the generation of hard disk drives changes regularly, it is necessary to set parameter values suited for the hard disk drives to the transceiver of, for example, the expander every time the generation of the hard disk drives changes. However, it is impossible to prepare many parameter values in a disk controller, corresponding to all the hard disk drives presumed to be used in the future. Therefore, every time a hard disk drive is added, the prior disk array system cannot operate the added hard disk drive based on desirable settings unless parameter values suited for that hard disk drive are obtained in some way.

The present invention was devised in light of the circumstances described above, and it is an object of the invention to suggest a disk array system capable of operating an arbitrary hard disk drive, which has been added, in a specific operation mode suited for that hard disk drive, and a hard disk drive expansion method for such a disk array system.

Solution to Problem

In order to solve the above-described problems, a disk array system including a disk unit equipped with at least one hard disk drive capable of changing the operating status based on settings, and a disk controller on which the disk unit is mounted, is provided according to an aspect of the present invention, characterized in that the disk controller includes: a disk adapter for attaching and removing a hard disk drive that has held particular parameter information in advance including information regarding a specific operation mode suited for operation; and a processor that, as triggered by attachment of the hard disk drive to the disk adapter, operates the hard disk drive in a predetermined operation mode based on predetermined parameter information that has been prepared in advance, reads the particular parameter information from the hard disk drive, and operates the hard disk drive in the specific operation mode based on the particular parameter information.

Also, a hard disk drive expansion method for a disk array system including a disk unit equipped with at least one hard disk drive capable of changing the operating status based on settings, and a disk controller on which the disk unit is mounted, is provided according to another aspect of the present invention, characterized in that the hard disk drive expansion method includes: an initial boot step executed by the processor, as triggered by attachment, to a disk adapter, of a hard disk drive that has held particular parameter information in advance including information regarding a specific operation mode suited for operation, of operating the hard disk drive in a predetermined operation mode based on predetermined parameter information that has been prepared in advance; an acquisition step executed by the processor of reading the particular parameter information from the hard disk drive in the predetermined operation mode; and a normal operation step executed by the processor of operating the hard disk drive in the specific operation mode based on the particular parameter information.

Advantageous Effects of Invention

Even if an arbitrary hard disk drive is added, the hard disk drive can be operated in a specific operation mode suited for that hard disk drive according to the present invention.

BRIEF DESCRIPTION OF DRAWINGS

FIG. 1 is a block diagram showing the general configuration of a disk array system according to an embodiment of the present invention.
FIG. 2 is a block diagram showing an example of the configuration of a switch device.
FIG. 3 is a block diagram showing an example of the configuration of an expander.
[FIG. 4]
FIG. 4 shows an example of the content of initial data.
FIG. 5 is a flowchart illustrating an example of actions of each component when the disk array system is booted in a low-speed mode.
FIG. 6 is a flowchart illustrating an example of actions of each component when the disk array system is booted in a low-speed mode.
FIG. 7 is a flowchart illustrating an example of actions of each component when the disk array system is booted in a low-speed mode.
FIG. 8 is a flowchart illustrating processing for judging the necessity of a parameter information acquisition request.
FIG. 9 is a flowchart illustrating parameter information reading and mode switching processing.
FIG. 10 is a flowchart illustrating processing for judging the necessity of a parameter information acquisition request.
FIG. 11 is a flowchart illustrating processing for judging the necessity of a parameter information acquisition request.
FIG. 12 is a flowchart illustrating parameter information reading and mode switching processing.
FIG. 13 is a flowchart illustrating parameter information reading and mode switching processing.
FIG. 14 is a flowchart illustrating parameter information reading and mode switching processing.
FIG. 15 is a block diagram showing an example of the configuration of a converter.

REFERENCE SIGNS LIST

Figure 1:
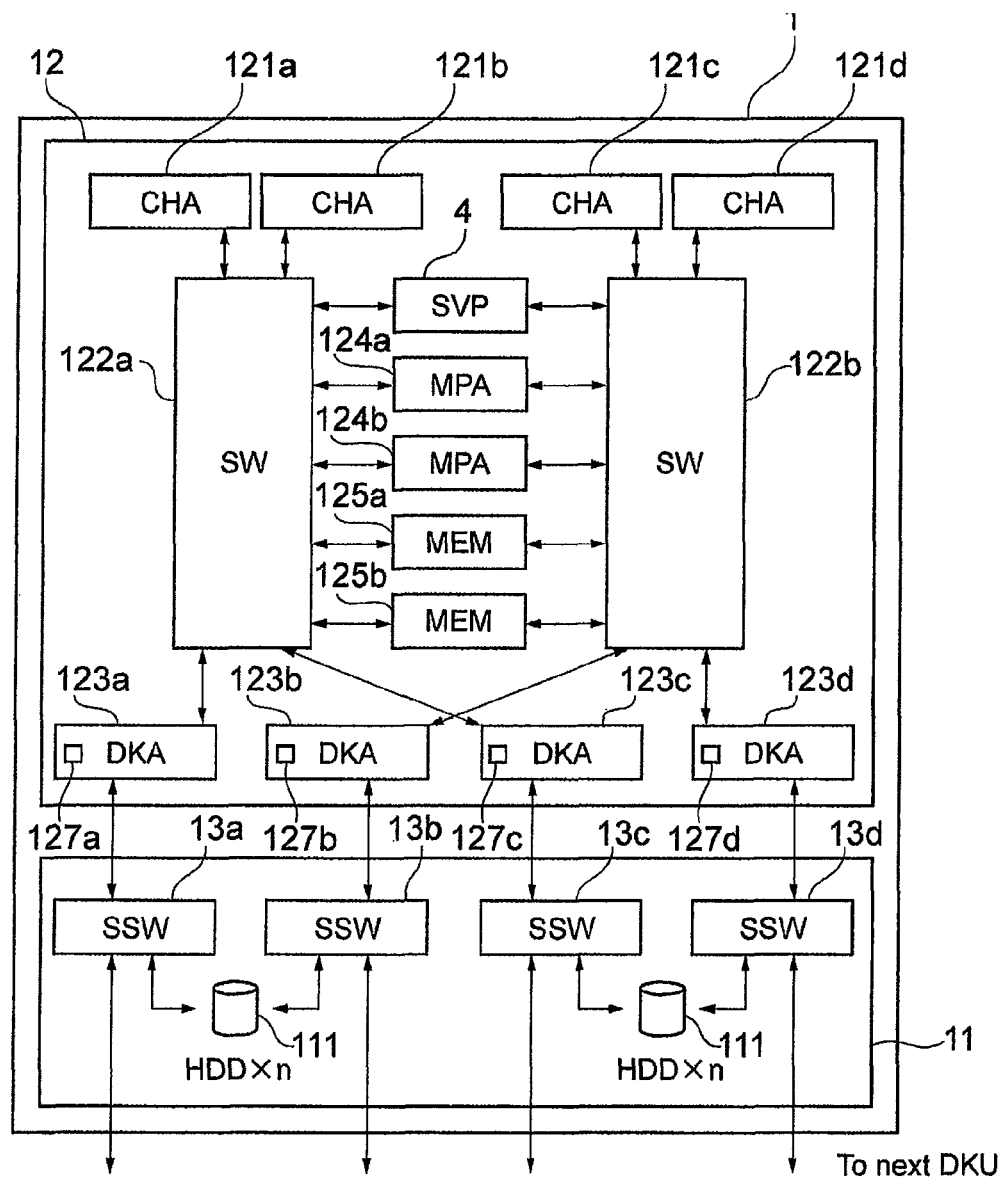
[FIG. 1]

1 Disk array system
11 Disk unit
12 Disk controller
13a to 13d Switch devices
111 Hard disk drive
121a to 121d Channel adapters
122a, 122b Switch devices
123a to 123d Disk adapters
124a, 124b Processors
125a, 125b Memories
127a to 127d Controllers of Disk adapters
130 Expander
131 Port

[Description Of Embodiments]
An embodiment of the present invention will be explained below in detail with reference to the attached drawings.
(1) Configuration of Disk Array System
FIG. 1 shows the general configuration of a disk array system 1 according to an embodiment of the present invention. The disk array system 1 includes a disk unit 11 containing storage media for storing data, and a disk controller 12 for controlling the disk unit 11. The disk unit 11 and the disk controller 12 are connected to each other via disk adapters 123a to 123d.
(1-1) Configuration of Disk Unit
The disk unit 11 includes at least one hard disk drive 111 (the number is n in an example shown in FIG. 1) as the storage media, switch devices 13a to 13d, and drive circuits (not shown) for controlling driving of the hard disk drive(s) 111. On a side note, an abbreviation, HDD, is used to represent a hard disk drive 111 in the drawing. The disk unit 11 may be equipped with solid-state devices such as flash memories instead of such hard disk drive(s) 111.

The disk unit 11 is connected to the disk controller 12 via the switch devices 13a, etc. contained in the disk unit 11. A plurality of disk units 11 can be connected in various manners by using a plurality of switch devices 13a, etc. Each switch device 13a has an expander described later. The connection form in which the disk unit 11 is connected to the disk controller 12 is defined by a connection map.

RAID groups are formed based on a so-called RAID (Redundant Arrays of Inexpensive Disks) structure for each hard disk drive 111 mounted on the disk unit 11, and each hard disk drive 111 is accessed under the RAID control. A RAID group may extend across a plurality of disk units 11. A plurality of hard disk drives 111 belonging to the same RAID group are recognized as one virtual logical device by a host computer (not shown) serving as a host system.
(1-2) Configuration of Disk Controller
The disk controller 12 is a system component that controls the entire disk array system 1 and whose main role is to execute input/output processing on the disk unit 11 in response to an access request from the host computer (not shown). This disk controller 12 executes processing relating to management of the disk array system 1 in response to various requests made by a service processor 4.

The disk controller 12 includes channel adapters (CHA) 121a to 121d, switch devices 122a, 122b, disk adapters (DKA) 123a to 123d, processor arrays 124a, 124b, and memories 125a, 125b. Each component contained in the disk controller 12 is dualized from the viewpoint of fault tolerance, and the disk controller 12 can access the disk unit 11, using more than two channels (connection paths).

Channel adapters 121a, etc. are an interface used to connect with the host computer via a network (not shown), and controls data communication with the host computer according to a specified protocol. For example, after receiving a write command from the host computer, the channel adapters 121a, etc. respectively write the write command and the data according to the write command in memory 125a, 125b via the switch devices 122a, 122b. The channel adapter 121 may be called a host interface or a front-end interface.

Each switch device 122a, 122b is an interface with each component in the disk controller 12 and controls data transmission/reception from and to each component.

Disk adapters 123a, etc. are interfaces used to connect with the disk unit 11, and control data communication with the disk unit 11 according to a specified protocol in accordance with I/O commands from the host computer. Disk adapters 123a, 123b, 123c, 123d respectively include controllers 127a, 127b, 127c, 127d.

Concretely, if the controllers 127a, etc. of the disk adapters 123a, etc., for instance, receive a write command, the disk adapters 123a, etc. access the disk unit 11 in order to destage data in the memories 125a, etc., which are designated by the write command, to the disk unit 11 (that is, a predetermined storage area in the hard disk drive 111). If the controllers 127a, etc. of the disk adapters 123a, etc. receive a read command, the disk adapters 123a, etc. access the disk unit 11 in order to stage data in the disk unit 11, which is designated by the read command, onto the memories 125a, etc.

The disk adapters 123a, etc. have a failure recovery function in addition to the above-described I/O function. These functions are realized as, for example, firmware. The disk adapters 123a, etc. may sometimes be called a disk interface or a back-end interface.

Processor arrays 124a, etc. control actions of the entire disk array system 1 by executing various control programs loaded on the memories 125a, etc. and controlling actions of the disk controller 12. The processor arrays 124a, etc. may be equipped with an internal memory capable of storing, for example, parameter information described later. The processor array will be hereinafter simply called the processor in an abbreviated form. Because the processors 124a, 124b have similar configurations, only the processor 124a will be explained. Also, because the memories 125a, 125b have duplex configurations, the memory 125a will mainly be hereinafter used for explanation.

The memory 125a functions as a main memory for the processor 124a. The memory 125a functions as a cache memory for the channel adapters 121a, etc. and the disk adapters 123a, etc. as well. Because the memories 125a, 125b have similar configurations, the memory 125a will mainly be hereinafter used for explanation. The memory 125a is constituted from, for example, a volatile memory such as DRAM (Dynamic RAM) or a nonvolatile memory such as flash memory. The memory 125a also stores system configuration information regarding the disk array system 1 itself. The system configuration information contains logical volume configuration information, RAID structure information, a connection path map, and a connection path reconstruction table. For example, when the disk array system 1 is powered on, the system configuration information is read from a specific storage area in accordance with an initial process under the control of the processor 124a and loaded onto the memory 125a.

The service processor 4 has a function of managing the entire disk array system 1. The service processor 4 according to the present embodiment is configured to be contained in the disk controller 12. However, the service processor 4 may be configured as a management apparatus that is externally connected to the disk controller 12 via a management network (not shown) instead of the configuration above.

A system administrator can give an instruction to the disk controller 12 via the service processor 4 and thereby refer to, set, and change the system configuration information about the disk array system 1. For example, in conjunction with the addition of a hard disk drive 111, the system administrator can set logical volumes and virtual volumes and also set the RAID structure via the service processor 4.

Figure 2:
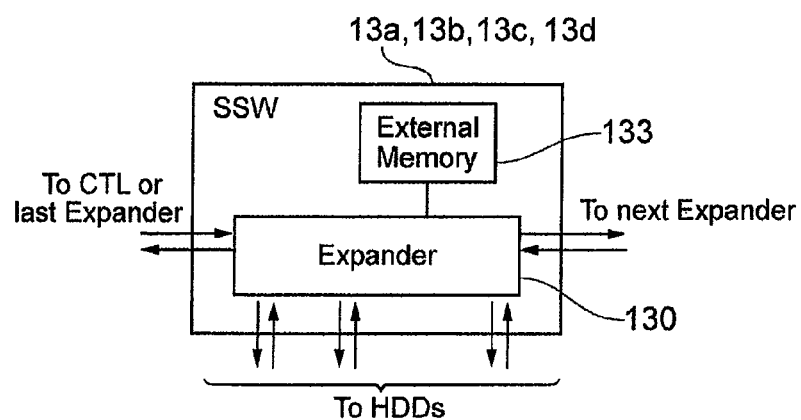
[FIG. 2]

FIG. 2 shows an example of the configuration of the switch device 13a. On a side note, because other switch devices 13b, 13c, 13d have almost the same configuration, the switch device 13a will be explained as a representative example. The switch device 13a has an external memory 133 and an expander 130. The external memory 133 is a storage medium for storing parameter information for controlling data transfer from and to each device connected to the expander 130. The external memory 133 also stores initial data described later.

The expander 130 has ports to which any devices such as the disk adapters 123a, etc. on the controller 12, other switch devices 13b, etc., and the hard disk drive 111 are connected. Each port has a transceiver, which will be explained later in detail. If a parameter value(s) contained in the parameter information is set to each transceiver, the expander 130 can optimize the status of data transfer from and to a device connected to the transceiver. The hard disk drive 111 also has a transceiver of the hard disk drive 111. If a parameter value(s) contained in the parameter information is set to each transceiver, the hard disk drive 111 can optimize the status of data transfer from and to a device connected to the transceiver. In this embodiment, a high-speed mode in which data is transferred at a high speed of, for example, 6 Gbps, and a low-speed mode in which data is transferred at a low speed of, for example, 3 Gbps, will be explained as examples of data transfer modes.

Figure 3:
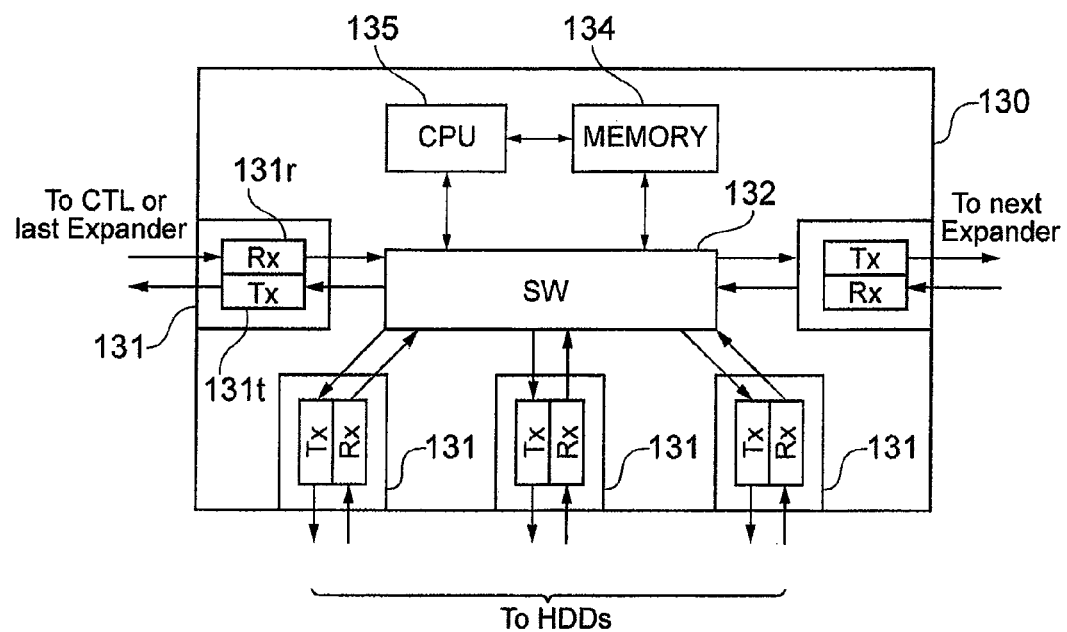
[FIG. 3]

FIG. 3 shows an example of the configuration of the expander 130. The expander 130 has a plurality of ports 131, a switch circuit 132, a CPU 135, and a memory 134. Each port 131 has a transmitter 131t (Tx), a receiver 131r (Rx), a buffer (not shown), and an error detection circuit (not shown).

The buffer temporarily stores reception data frames or transmission data frames. The error detection circuit monitors communication errors at each port 131. That is, the error detection circuit checks parity, etc. contained in the data frames passing through each port 131; and if a predetermined error pattern is matched, an error counter value for the error pattern is incremented. If the error counter value exceeds a specified threshold value, the error detection circuit outputs error information and writes it to the buffer via the switch circuit 132.

For example, the disk controller 12, other expanders 130, and the hard disk drives 111 of the disk unit 11 are connected to the ports 131. Each port 131 is assigned a unique number (port number) in the switch device 13, so that the ports 131 can identify each other. Each port 131 is connected to the switch circuit 132 within the expander 130.

The switch circuit 132 includes a switching element constituted from an address latch and a selector. The switch circuit 132 analyzes header information in a frame which has been input, and switches the transmission destination of the frame according to an address table.

The memory 134 stores the parameter information containing a parameter value(s) for optimizing data transfer. The CPU 135 sets a parameter value(s) regarding any of, or a combination of any of, the location of the hard disk drive 111, signal amplitude, pre-emphasis, and equalizer, to any of the transceivers 131t, 131r of the ports 131 based on the parameter information in the memory 134.

Initial Data

FIG. 4 shows an example of the content of the initial data. The initial data is information about so-called default settings and contains the link speed and the parameter value(s) for each transceiver 131t, 131r. Also, the transceiver will be referred to as PHY in the following explanation.

The link speed field indicates whether the interface speed setting is a low-speed mode (Low) or a high-speed mode (High). If it is in the low-speed mode, the low-speed mode field is set to 1 and the high-speed mode field is set to 0. On the other hand, if it is the high-speed mode, the low-speed mode field is set to 0 and the high-speed mode field is set to 1. If a certain parameter value is set, each relevant parameter field is set to 1; and if a certain parameter is not set, each relevant parameter field is set to 0. An example of the parameter value can be any of the signal amplitude, pre-emphasis, and equalizer as described above. On a side note, it is a matter of course that the link speed is included in the parameter information, and the link speed can be considered to be part of the parameter values.

(2) Example of Disk Array System's Actions

The configuration of the disk array system 1 has been described above. Next, a method for expanding the hard disk drive 111 in the disk array system 1 will be explained. On a side note, a high-speed mode is mentioned as an example of a specific operation mode suited (or best suited for) the operation of the hard disk drive 111, and a low-speed mode is mentioned as an example of a predetermined operation mode in this embodiment; however, the specific operation mode and the predetermined operation mode are not limited to the above examples, and other settings may be made. The expression link up (or link-up) means (both relevant devices) entering into the state capable of communication.

Circumstances where Parameter Value should be Optimized

The disk array system 1 supports data transfer at 6 Gbps as the high-speed mode. However, because data transfer in the high-speed mode will further increase degradation of signals significantly, there is a possibility that the link-up may not be realized at 6 Gbps unless good signal quality is secured by setting appropriate parameter values, such as the amplitude, pre-emphasis, and equalizer, to the transceivers of the controller 12, the expander 130, and the hard disk drive 111.

Because the connection relationship between an initiator and a target, including cables, is fixed between the controller 12 and the expander 130 and between the expanders 130, the parameter value(s) can be fixed at the time of initialization. This is because the connection relationship between these devices is not influenced by addition of a hard disk drive 111.

On the other hand, regarding the relationship between the expander 130 and the hard disk drive 111, the wiring length of the board varies depending on the location of the hard disk drive 111 in the disk unit 11, the hard disk drive 111 supports a plurality of models, and the signal property varies depending on the model of the hard disk drive 111. Therefore, regarding the disk array system 1, it is necessary to secure the good signal quality by flexibly changing the parameter value(s) regardless of at which location the hard disk drive 111 is mounted.

Because which hard disk drive 111 is mounted at which location in the disk array system 1 is not fixed, it is impossible to set the optimum parameter value(s) for each location in advance. Also, because there is a possibility that the disk array system 1 cannot be linked up in the high-speed mode without the optimum parameter(s), it is impossible to stably start the connection between the expander 130 and the hard disk drive 111 in the high-speed mode at the time of the initial boot.

In order to switch the interface speed mode from the low-speed mode to the high-speed mode after initially booting the disk array system 1 in the low-speed mode, the optimum parameter value(s) is set to the expander 130 and the hard disk drive 111 according to each location and the model of the hard disk drive 111. Because a generation change of hard disk drives 111 takes place periodically, it is impossible to store all the optimum parameter values for possible hard disk drives 111 that will be commercialized in the future, in the disk array system 1 in advance.

If each hard disk drive 111 stores a parameter value(s) for itself being in the optimum state, that is, the optimum parameter value(s) for the transceiver(s) of hard disk drives 111 at all the locations in the disk array system 1 and the optimum parameter value(s) for the transceivers 131*t*, 131*r* of the expanders 130, and when a hard disk drive 111 is mounted on the disk array system 1, the controller 12 reads the parameter information from the hard disk drive 111 and sets the read parameter information to the expander 130 and the hard disk drive 111, thereby making it possible to set the optimum parameter value(s) to all the locations. The case where the parameter value(s) is set to the transceiver(s) of the expander 130 will mainly be explained below. Meanwhile, the parameter value(s) is set to the transceiver(s) of the hard disk drive 111 in almost the same manner.

(3) Hard Disk Drive Expansion Method (3-1) Boot in Low-Speed Mode (at the Time of System Power-On)

Figure 5:
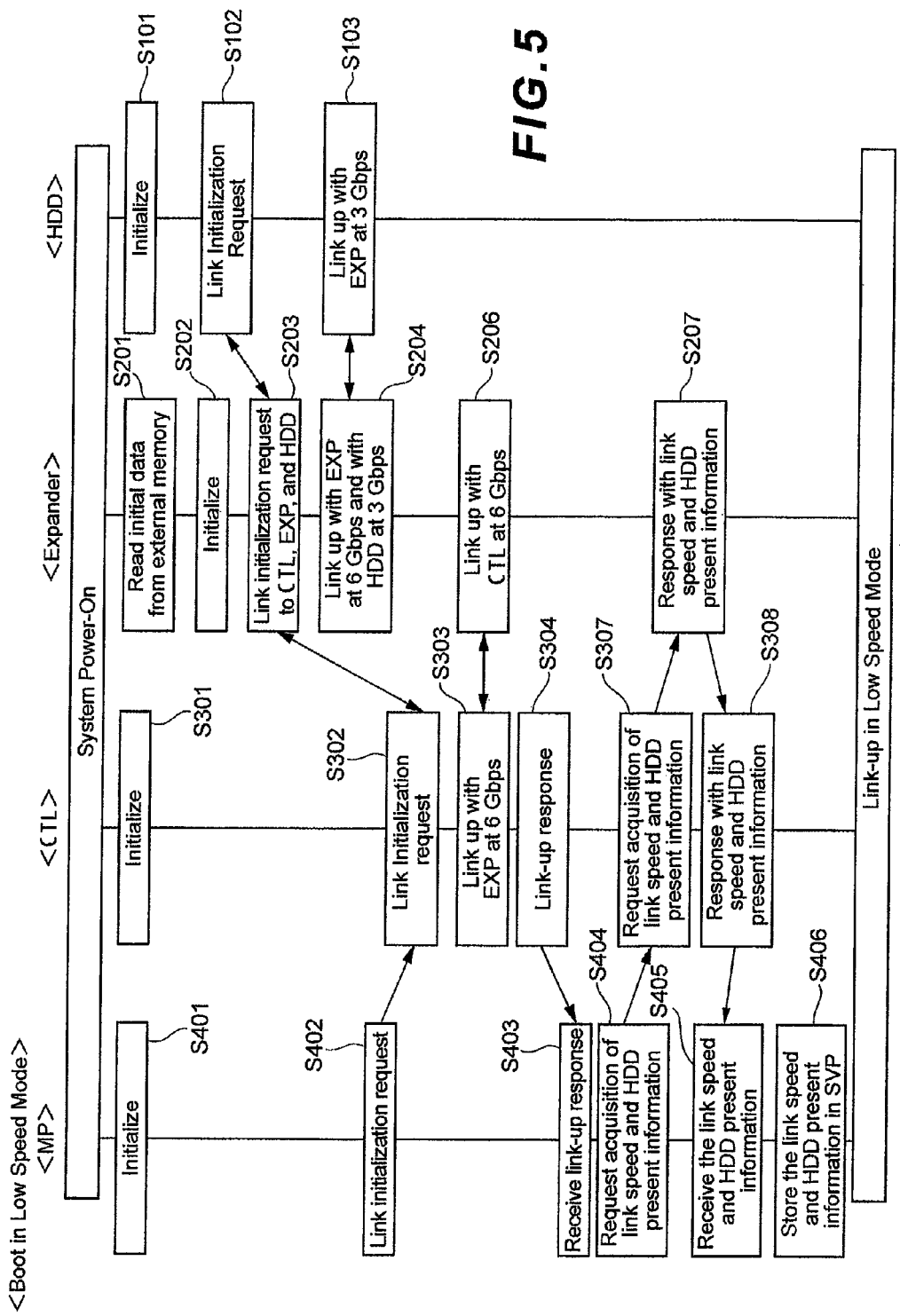
[FIG. 5]

FIG. 5 shows an example of actions of each component when booted in the low-speed mode. In the example shown in FIG. 5, a sequence of actions aligned in the leftmost vertical line indicates processing executed by the processor 124*a* (represented as MP in drawings), a sequence of actions aligned in the second vertical line from left indicates processing executed by the controllers 127*a*, etc. of the disk adapters 123*a*, etc. (represented as CTL in drawings), a sequence of actions aligned in the second vertical line from right indicates processing executed by the expander 130 (which is represented as Expander or EXP in the drawing), and a sequence of actions aligned in the rightmost vertical line indicates processing executed by the hard disk drive 111. The same explanation applies to FIGS. 6 and 7 described later.

As the system is powered on as shown in FIG. 5, all the devices execute initialization (initial setting) processing (steps S101, S201, S202, S301, S401). Concretely, the expander 130 reads initial data from the external memory 133 (step S201) and then executes initialization based on this initial data (step S202). This initial data contains a speed setting value for each port of the expander 130; and the speed mode of a port connected to the hard disk drive 111 is the low-speed mode (for example, 3 Gbps), while the speed mode of other ports is the high-speed mode (for example, 6 Gbps).

After completing the initialization, the expander 130 and the hard disk drive 111 issue a link initialization request (steps S102, S203*b*) and execute link initialization processing between the devices. As a result, the expander 130 and the hard disk drive 111 are linked up in the low-speed mode (steps S103, S204).

The processor 124*a* issues a link initialization request to the controller 127*a* (step S402), and the controller 127*a* makes a link initialization request to the expander 130 (step S302). Because the expander 130 has made the link initialization request, the controller 127*a* and the expander 130 are linked up in the high-speed mode (steps S303, S206); and the controller 127*a* reports the link-up to the processor 124*a* and the processor 124*a* thereby confirms the success of the link-up (steps S208, S304, S403).

Subsequently, the processor 124*a* checks the link speed and the present information (or mounting information) regarding the hard disk drive (steps S404, S307, S207, S308, S405), thereby completing booting in the low-speed mode. For example, an SMP command according to the SAS (Serial Attached SCSI) standard is used in order to check the link speed from the controller 127*a* and the present information regarding the hard disk drive. In step S406, the processor 124*a* stores the link speed and the present information in a memory unit contained in the service processor 4.

(3-2) Boot in Low-Speed Mode (when Hard Disk Drive is Added)

Figure 6:
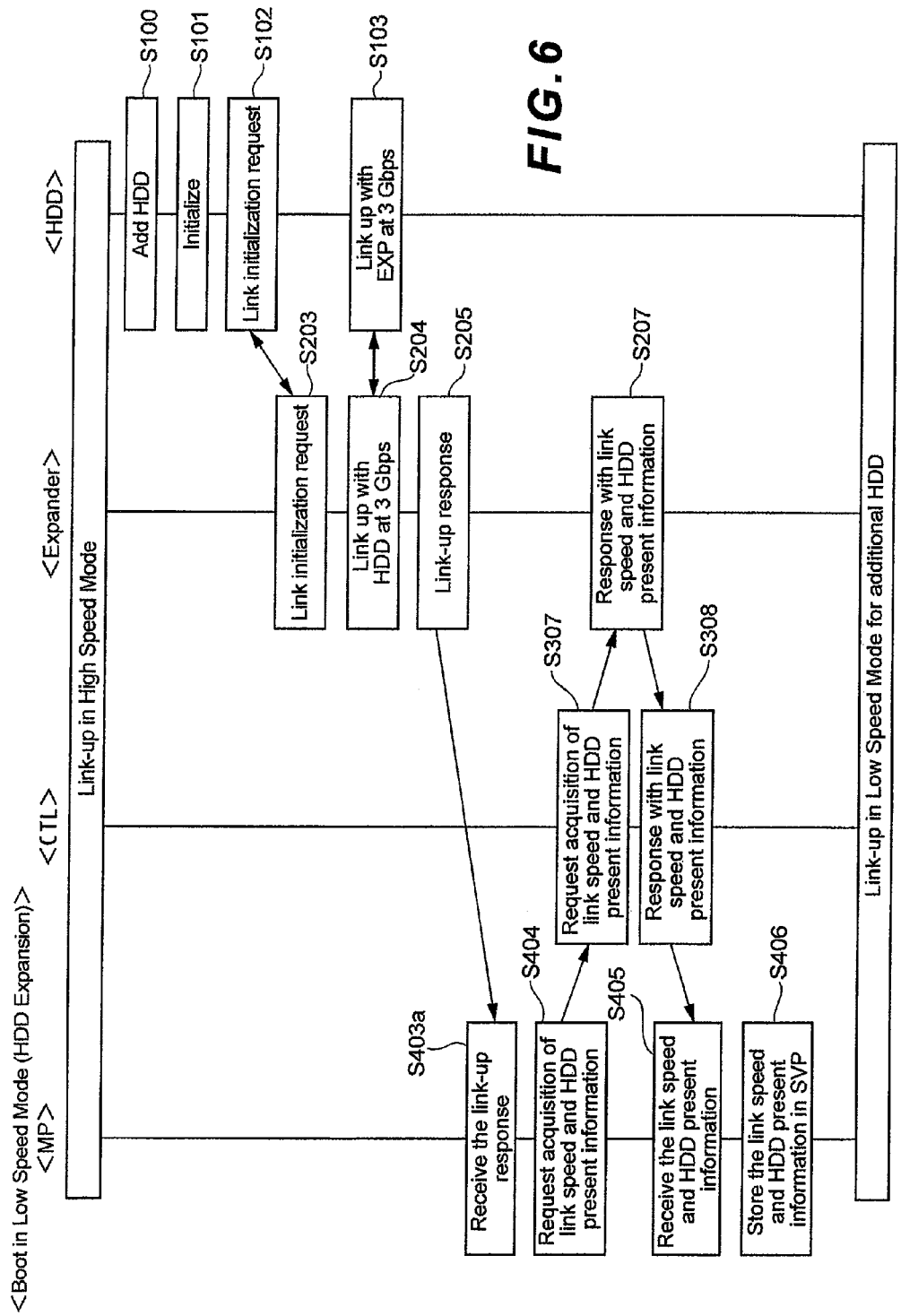
[FIG. 6]

FIG. 6 shows boot processing in the low-speed mode when a hard disk drive 111 is added. Because most of the processing steps in this flowchart, except for only part of them, are almost the same as those shown in FIG. 5, an explanation about the same processing steps has been omitted and the differences between them will mainly be explained below.

Because the system is already in operation in the high-speed mode when a hard disk drive 111 is added, steps S201, S202, S206, S301, S302, S303, S304, S401, S402 in FIG. 5 are omitted in this flowchart.

Because the system is already in operation in the high-speed mode when the hard disk drive 111 is added as mentioned above, as triggered by the hard disk drive expansion (step S100), the added hard disk drive 111 is initialized (step S101) and issues a link initialization request to the expander 130 (step S102).

As triggered by this link initialization request, the expander 130 makes the link initialization request (step S203) and links up with the controller 127a (steps S103 and S204). Because the expander 130 uses the initial data in the external memory 133, the expander 130 links up with the hard disk drive 111 in the low-speed mode and respectively with another expander 130 and the controller 127a in the high-speed mode.

The expander 130 sends a link-up response to the processor 124a (step S205), and the processor 124a receives the link-up response from the expander 130 (step S403a). Subsequent processing steps are similar to those in FIG. 5 and, therefore, an explanation thereof has been omitted.

(3-3) Boot in Low-Speed Mode (Link Initialization by Processor)

Figure 7:
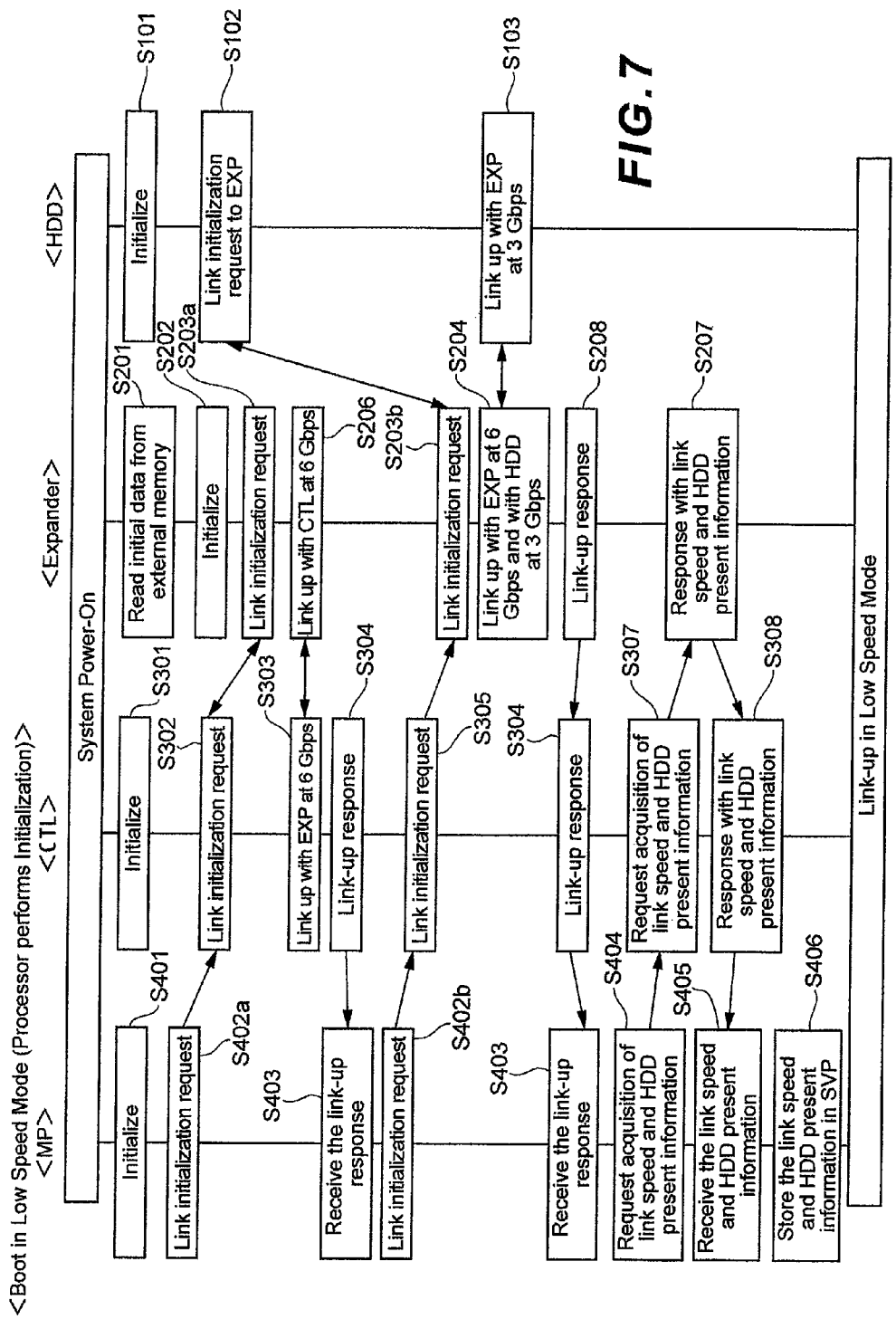
[FIG. 7]

FIG. 7 shows an example of a processing sequence when the system is booted in the low-speed mode. Because most of the processing steps in FIG. 7, except for only part of them, are almost the same as those shown in FIG. 5, an explanation about the same processing steps has been omitted and the differences between them will mainly be explained below.

In the aforementioned processing sequence shown in FIG. 5, the expander 130 automatically makes the link initialization request after completion of the initialization of the expander 130 and the hard disk drive 111 (step S203 in FIG. 5). On the other hand, in the flowchart shown in FIG. 7, the processor 124a plays a central role in link initialization control.

Concretely, after completing the initialization (step S401), the processor 124a makes the link initialization request to the controller 127a (step S402a) and also makes the link initialization request via the controller 127a to the expander 130 (steps S402b, S305). In response to the link initialization request, the expander 130 makes the link initialization request to the controller 127a and then links up with the controller 127a in the high-speed mode (steps S203a, S206, S303), and also links up with the hard disk drive 111 and another expander 130 in the low-speed mode (steps S204, S103). Subsequent processing steps are similar to those in FIG. 5 and, therefore, an explanation thereof is omitted.

If the above-described procedures are followed, the expander 130 and the hard disk drive 111 start link initialization in accordance with an instruction from the processor 124a. As compared to the case where the link initiation request is automatically issued after completion of the initialization of the expander 130 and the hard disk drive 111 as shown in FIG. 5, the above-described procedure has advantages that it is possible to control a plurality of hard disk drives 111 to prevent them from simultaneously executing the link initialization processing and prevent the load power from temporarily reaching a peak in the configuration where the plurality of hard disk drives 111 are connected to the expanders 130.

Figure 8:
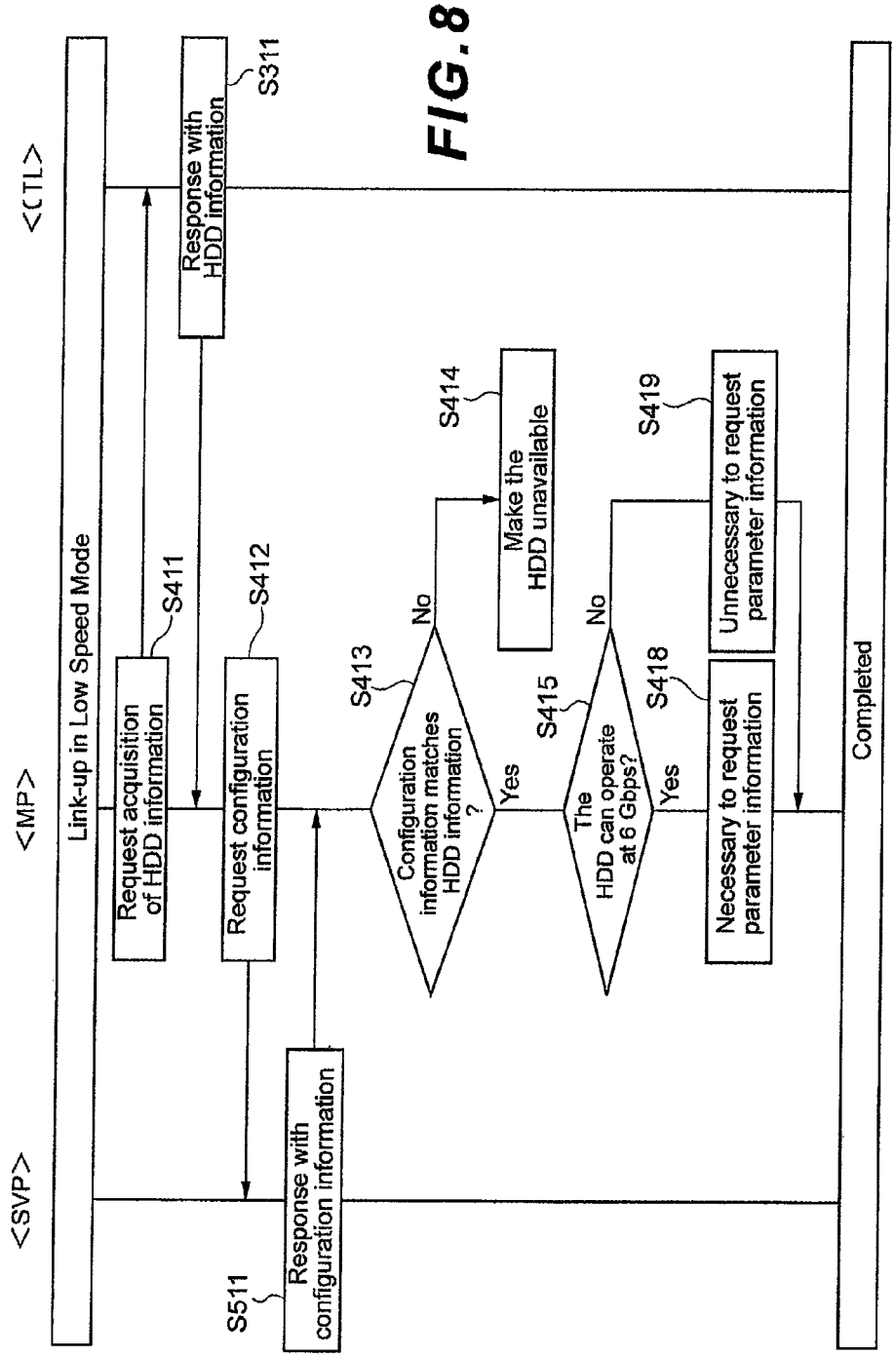
[FIG. 8]

(3-4) Processing for Judging the Necessity of Parameter Information Acquisition Request FIG. 8 shows processing for judging the necessity of a parameter information acquisition request. In the example shown in FIG. 8, a sequence of actions aligned in the left-side vertical line indicates processing executed by the service processor 4, a sequence of actions aligned in the middle vertical line indicates processing executed by the processor 124a, and a sequence of actions aligned in the right-side vertical line indicates processing executed by the controller 127a. The same explanation applies to FIGS. 10 and 11 described later.

This necessity judgment processing judges whether it is necessary or not to read and obtain the parameter information from, for example, the hard disk drive 111. Such necessity judgment processing is executed firstly because not all the hard disk drive 111 can necessarily operate in the high-speed mode, and secondly because if parameter information about the same model of the hard disk drive 111 is already stored in the memory 125a, that parameter information can be used again.

The processor 124a issues a request for hard disk drive information regarding the hard disk drive 111, which has been booted in the low-speed mode, to the controller 127a (step S411). In response to the request made by the processor 124a, the controller 127a responds to the processor 124a with the hard disk drive information regarding the hard disk drive 111 including the model name, capacity, and number of revolutions (step S311).

Subsequently, the processor 124a requests system configuration information from the service processor 4 (step S412). In response to this request, the service processor 4 returns the system configuration information, which has been already registered at the time of construction of the system, to the processor 124a (step S511).

The processor 124a compares these pieces of information and checks whether the system configuration information matches the HDD information or not (step S413). If the system configuration information does not match the HDD information, the processor 124a executes processing for making the hard disk drive 111 unavailable (step S414). On the other hand, if the system configuration information matches the HDD information, the processor 124a then checks if the hard disk drive 111 can operate in the high-speed mode (at 6 Gbps) or not (step S415). If the hard disk drive 111 can operate in the high-speed mode, the processor 124a determines that it is necessary to request the parameter information (step S418). On the other hand, if the hard disk drive 111 cannot operate in the high-speed mode, the processor 124a determines that it is unnecessary to request the parameter information (step S419).

(3-5) Parameter Information Reading and High-Speed Mode Switching

Figure 9:
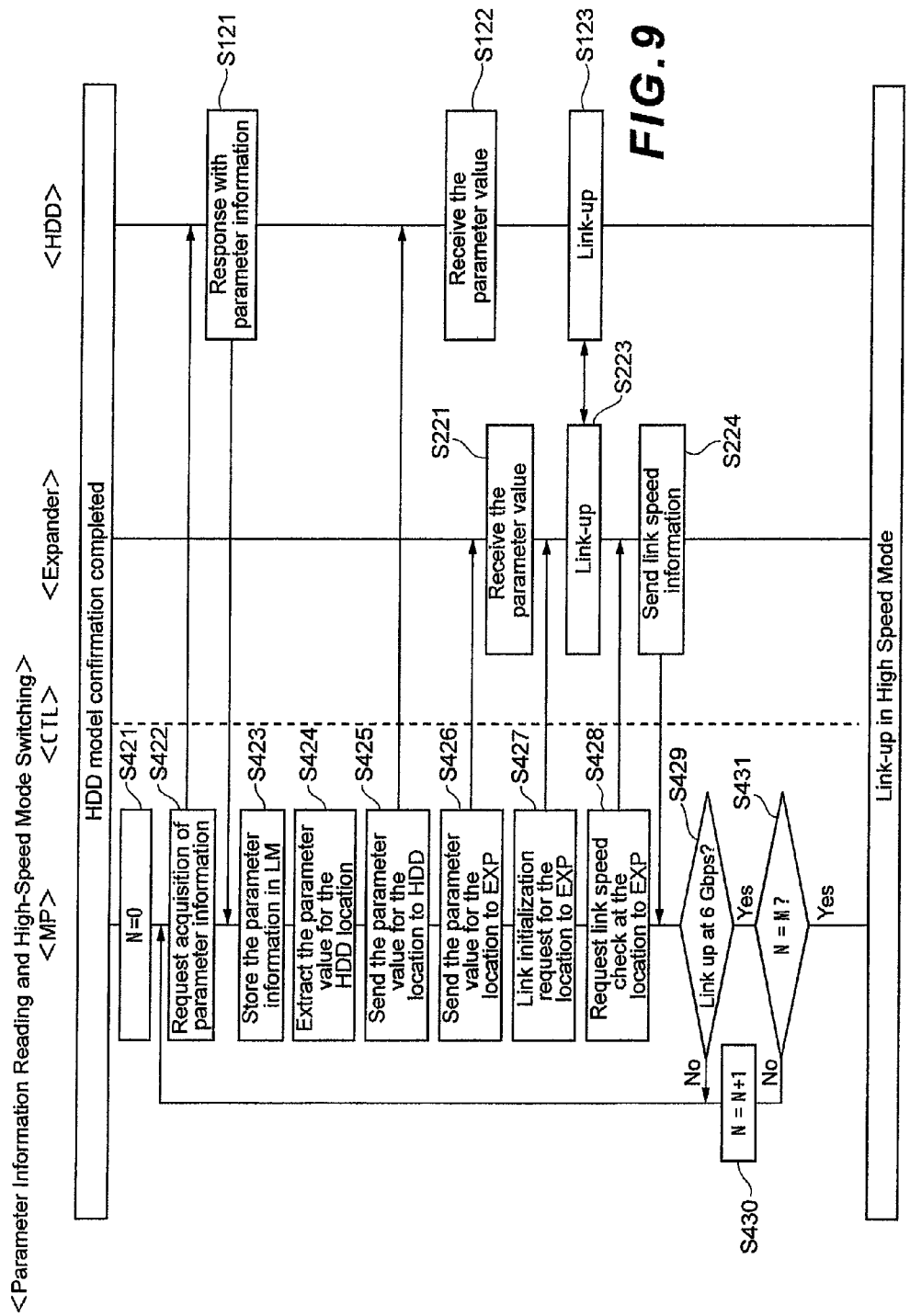
[FIG. 9]

FIG. 9 shows parameter information reading and high-speed mode switching processing. In the example shown in FIG. 9, a sequence of actions aligned in the leftmost vertical line indicates processing executed by the processor 124a, a sequence of actions aligned in the second vertical line from left indicates processing executed by the controller 127a of the disk adapter 123a, a sequence of actions aligned in the second vertical line from right indicates processing executed by the expander 130, and a sequence of actions aligned in the rightmost vertical line indicates processing executed by the hard disk drive 111. The same explanation applies to FIGS. 12 to 14 described later.

The flowchart in FIG. 9 illustrates processing executed on the hard disk drive 111 when it is determined that the parameter information acquisition request is necessary. The processor 124*a* assigns a number to each of the hard disk drive 111 for which the parameter information acquisition request is necessary, the disk number is regarded as n. The processor 124*a* executes parameter information acquisition request processing on the hard disk drive 111 whose disk number N is zero (steps S421, S422, S121).

For example, a Log Sense command according to the SCSI standard is used in this parameter information acquisition request processing. The processor 124*a* stores the obtained parameter information in a local memory (not shown) (step S423), extracts a parameter value for the location, where the hard disk drive is mounted, from the parameter information (step S424), and sets the parameter value to the hard disk drive 111 and the expander 130 (steps S425, S122, S426, S221). For example, a Mode Select command according to the SCSI standard can be used for setting of the parameter value. Furthermore, for example, a Mode Sense command according to the SCSI standard can be used for the setting confirmation.

Subsequently, the processor 124*a* makes the link initialization request to the expander 130 (step S427) and links up with the expander 130 and the hard disk drive 111 (steps S223, S123). Next, the processor 124*a* obtains the link speed of the hard disk drive 111 (steps S428, S224).

The processor 124*a* checks if they are linked up in the high-speed mode (step S429). If they are linked up in the high-speed mode, the processor 124*a* checks if all the hard disk drives 111 are respectively linked up with the expander (step S431). On the other hand, if they are not linked up in the high-speed mode, the processor 124*a* returns to step S422 described above and repeats the processing.

If all the hard disk drives 111 are respectively linked up in the high-speed mode in step S431, the processor 124*a* terminates the processing. On the other hand, if there is any hard disk drive remaining to be linked up, the processor 124*a* increments the disk number (step S430) and proceeds to the next hard disk drive.

If the processor 124*a* repeats the above-described processing and the speed mode of all the hard disk drives, which are mounted in the system and are the targets of the high-speed mode, is switched to the high-speed mode, the processing for switching to the high-speed mode is completed.

If the local memory does not have sufficient storage capacity to store all the pieces of parameter information for all the hard disk drives 111, the processor 124*a* may overwrite the parameter information already stored in the local memory with new parameter information every time the processing proceeds to the next hard disk drive 111. As a result, a storage area in the local memory, which is necessary for the above-described processing, can be reduced.

Figure 10:
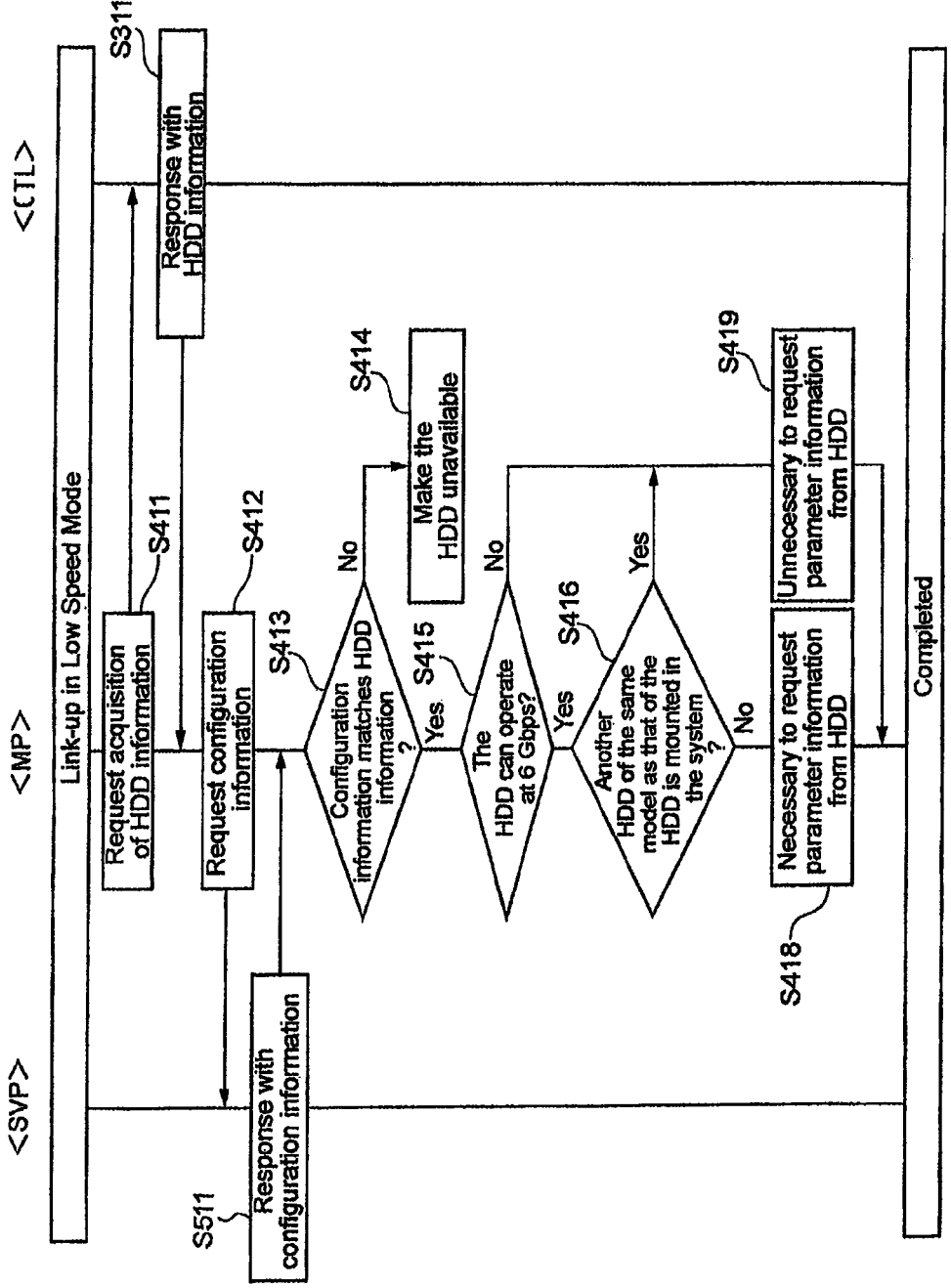
[FIG. 10]

(4) Other Embodiments (4-1) Processing for Judging the Necessity of Parameter Information Acquisition Request FIG. 10 shows processing for judging the necessity of a parameter information acquisition request. Because most of the processing steps in FIG. 10, except for only part of them, are almost the same as those shown in FIG. 8, an explanation about the same processing steps has been omitted and the difference between them will mainly be explained below.

The difference between the processing sequence shown in FIG. 8 and that shown in FIG. 10 is that step S416 exists in the processing sequence shown in FIG. 10. If the added hard disk drive 111 can operate in the high-speed mode, the processor 124*a* checks in step S416 if another hard disk drive 111 of the same model as that of the added hard disk drive 111 exists in the system or not.

If the processor 124*a* stores all the obtained pieces of parameter information and makes them remain in the local memory without overwriting the obtained parameter information, it is unnecessary to read the parameter information from the added hard disk drive 111 of the same model as that of the existing hard disk drive 111 in the system.

As a result, the processor 124*a* does not need to obtain the parameter information from the added hard disk drive 111 every time the hard disk drive 111 is added. So, a load will be reduced and the resources can be thereby allocated to another processing.

Figure 11:
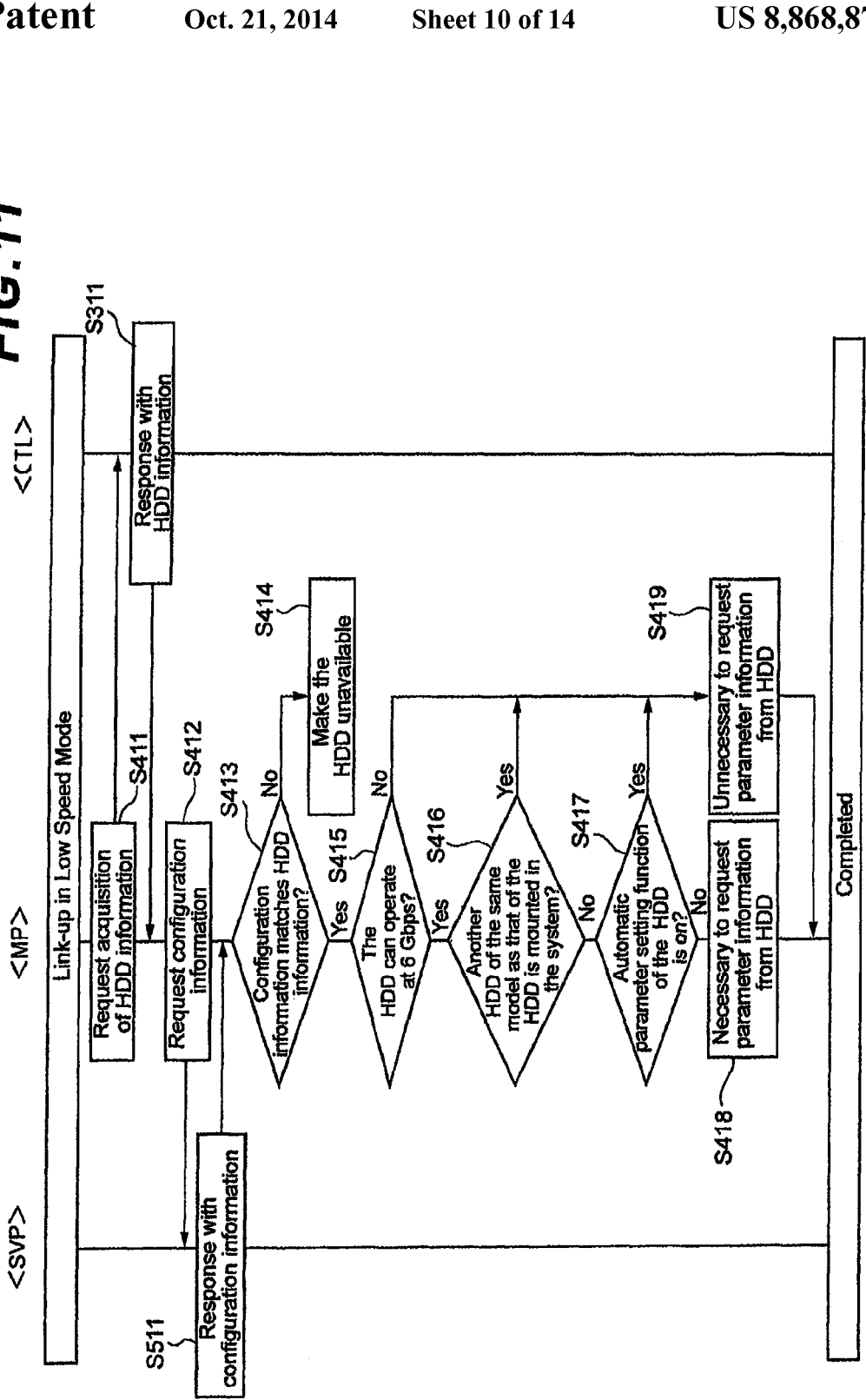
[FIG. 11]

(4-2) Processing for Judging the Necessity of Parameter Information Acquisition Request FIG. 11 shows processing for judging the necessity of a parameter information acquisition request. Because most of the processing steps in FIG. 11, except for only part of them, are almost the same as those shown in FIG. 10, an explanation about the same processing steps has been omitted and the difference between them will mainly be explained below.

The difference between the processing sequence shown in FIG. 10 and that shown in FIG. 11 is that step S417 exists in the processing sequence shown in FIG. 11. In step S417, the processor 124*a* prevents operation of the function setting the parameter value(s) as described in the above embodiment, if the hard disk drive 111 itself has a function that automatically sets the parameter value(s) based on the signal quality at the transceiver 131*t*, 131*r*, and the function is effective.

(4-3) Parameter Information Reading and High-Speed Mode Switching

Figure 12:
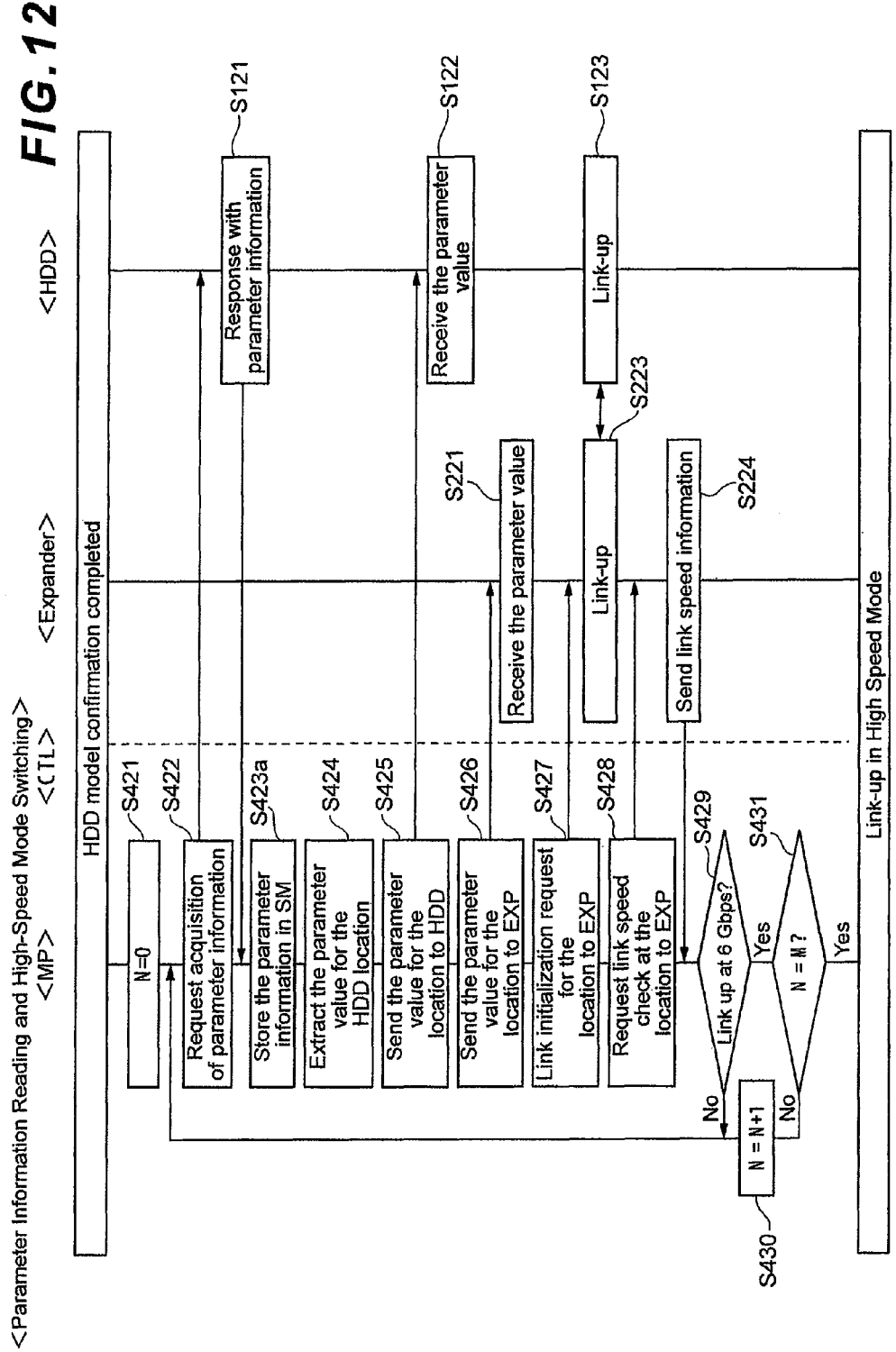
[FIG. 12]

FIG. 12 shows a processing sequence of parameter information reading and high-speed mode switching processing. Because most of the processing steps in FIG. 12, except for only part of them, are almost the same as those shown in FIG. 9, an explanation about the same processing steps has been omitted and the difference between them will mainly be explained below.

The difference between the processing sequence shown in FIG. 9 and that shown in FIG. 12 is processing relating to step S423*a* in FIG. 12. In step S423*a*, the processor 124*a* stores the parameter information, which has been received from the hard disk drive 111, in the shared memory 125*a* (which is SM in the drawing) instead of the local memory. As a result, the parameter information stored in the shared memory 125*a* can be accessed by another processor 125*b*.

(4-4) Parameter Information Reading and High-Speed Mode Switching

Figure 13:
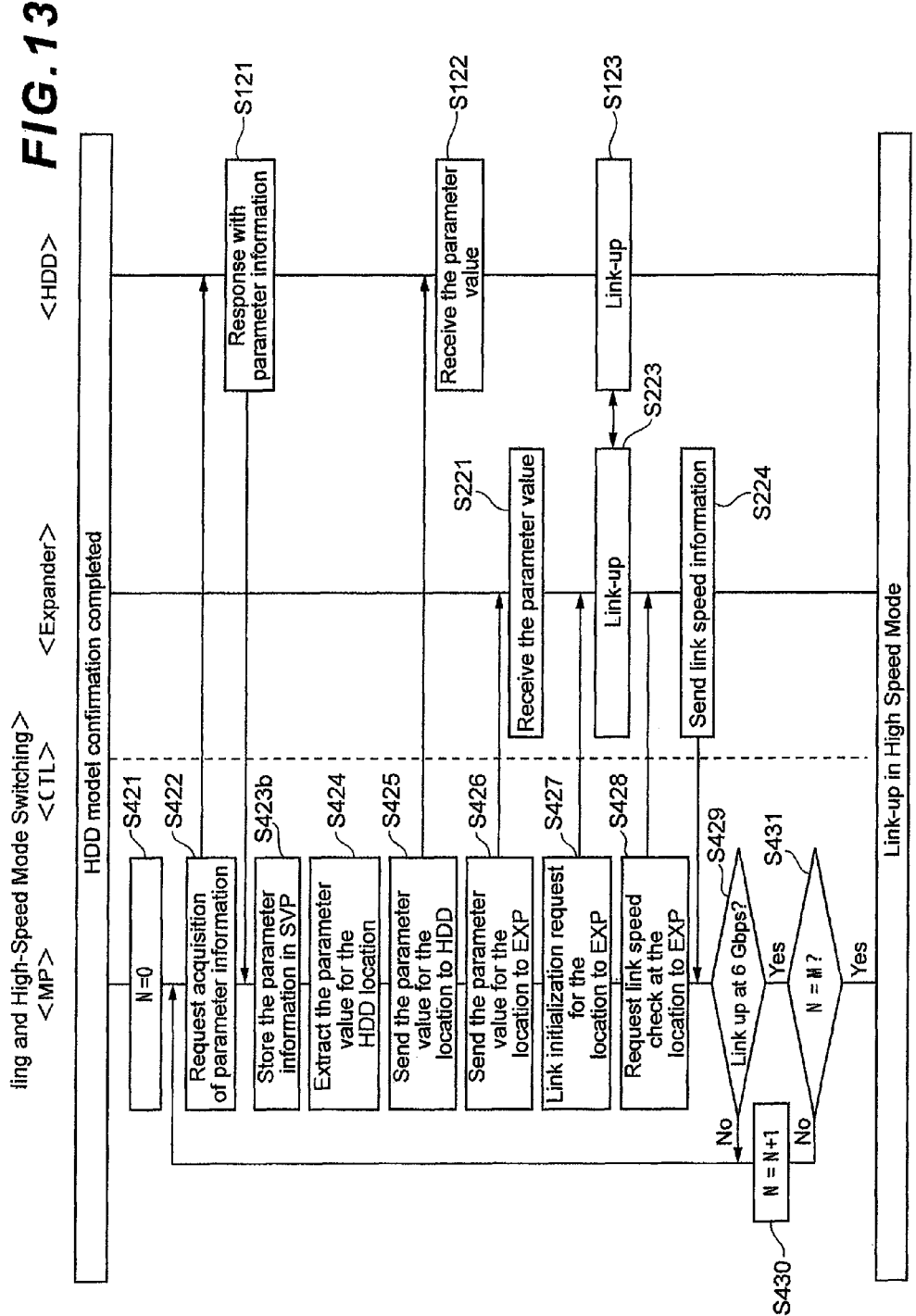
[FIG. 13]

FIG. 13 shows a processing sequence of parameter information reading and high-speed mode switching processing. Because most of the processing steps in FIG. 13, except for only part of them, are almost the same as those shown in FIG. 9, an explanation about the same processing steps has been omitted and the difference between them will mainly be explained below.

The difference between the processing sequence shown in FIG. 9 and that shown in FIG. 13 is processing relating to step S423*b* in FIG. 13. In step S423*b*, the processor 124*a* stores the parameter information, which has been received from the hard disk drive 111, in the service processor 4 (which is SVP in the drawing) instead of the local memory. As a result, the parameter information stored in a storage area in the service processor 4 can be accessed by another processor.

(4-5) Parameter Information Reading and High-Speed Mode Switching

Figure 14:
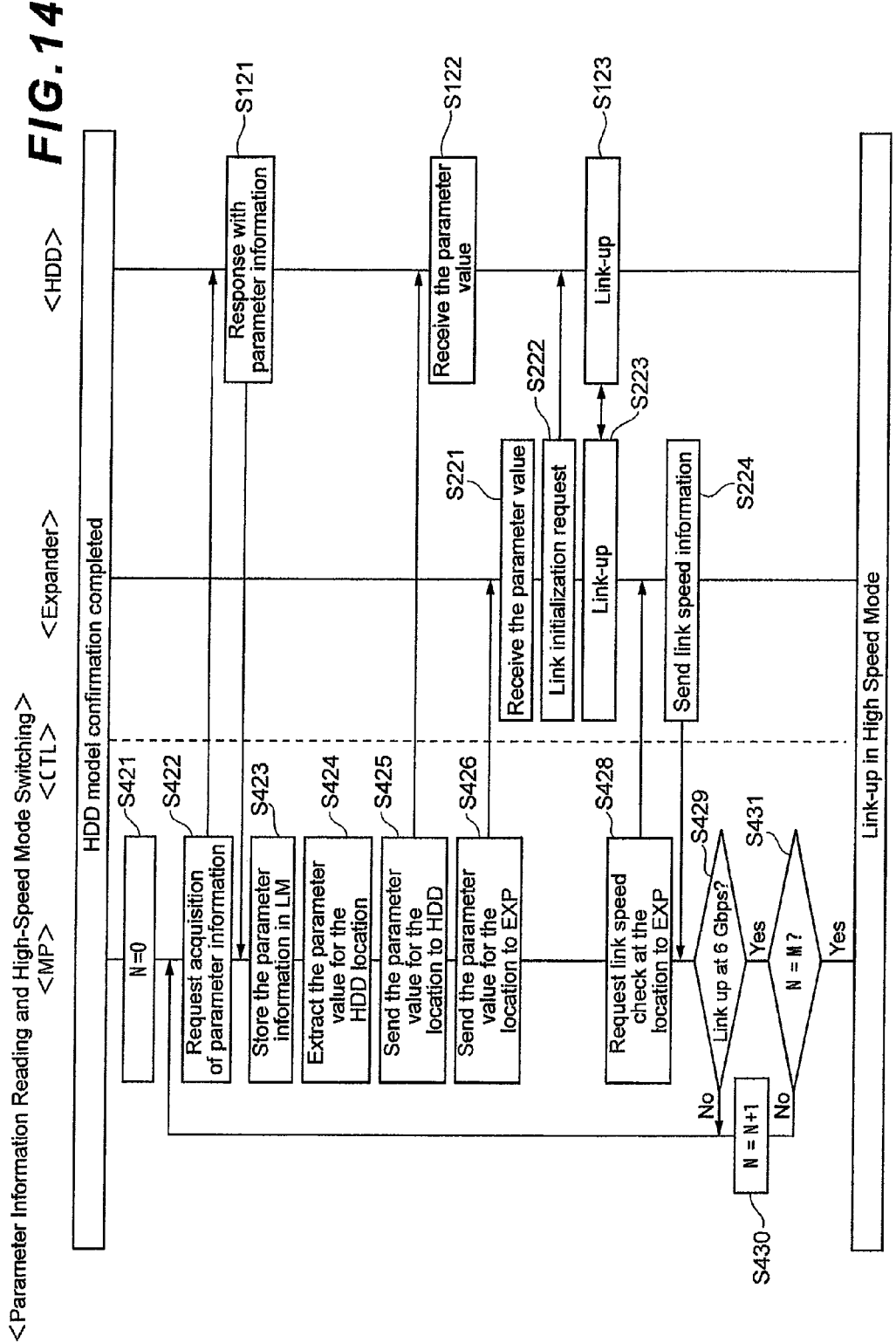
[FIG. 14]

FIG. 14 shows a processing sequence of parameter information reading and high-speed mode switching processing. Because most of the processing steps in FIG. 14, except for only part of them, are almost the same as those shown in FIG.

9, an explanation about the same processing steps has been omitted and the difference between them will mainly be explained below.

The difference between the processing sequence shown in FIG. 9 and that shown in FIG. 14 is processing relating to steps S222 in FIGS. 14 and S427 in FIG. 9. After receiving the parameter value(s) from the processor 124*a*, the expander 130 itself makes the link initialization request in step S222. In other words, in the processing sequence shown in FIG. 14, the processor 124*a* no longer needs to make the link initialization request to the expander 130 like in step S427 in FIG. 9.

Concretely, in FIG. 9, the processor 124*a* sets the parameter value(s) to the expander 130 and the hard disk drive 111 and then makes the link initialization request (step S426, S425, S427). On the other hand, in the processing sequence shown in FIG. 14, after the processor 124*a* sets the parameter value(s) to the expander 130, the expander 130 instead of the processor 124*a* automatically starts making the link initialization request to the hard disk drive 111 (step S222). With this arrangement, it is possible to reduce a load on the processor 124*a*.

(4-6) One-Port Hard Disk Drive

Figure 15:
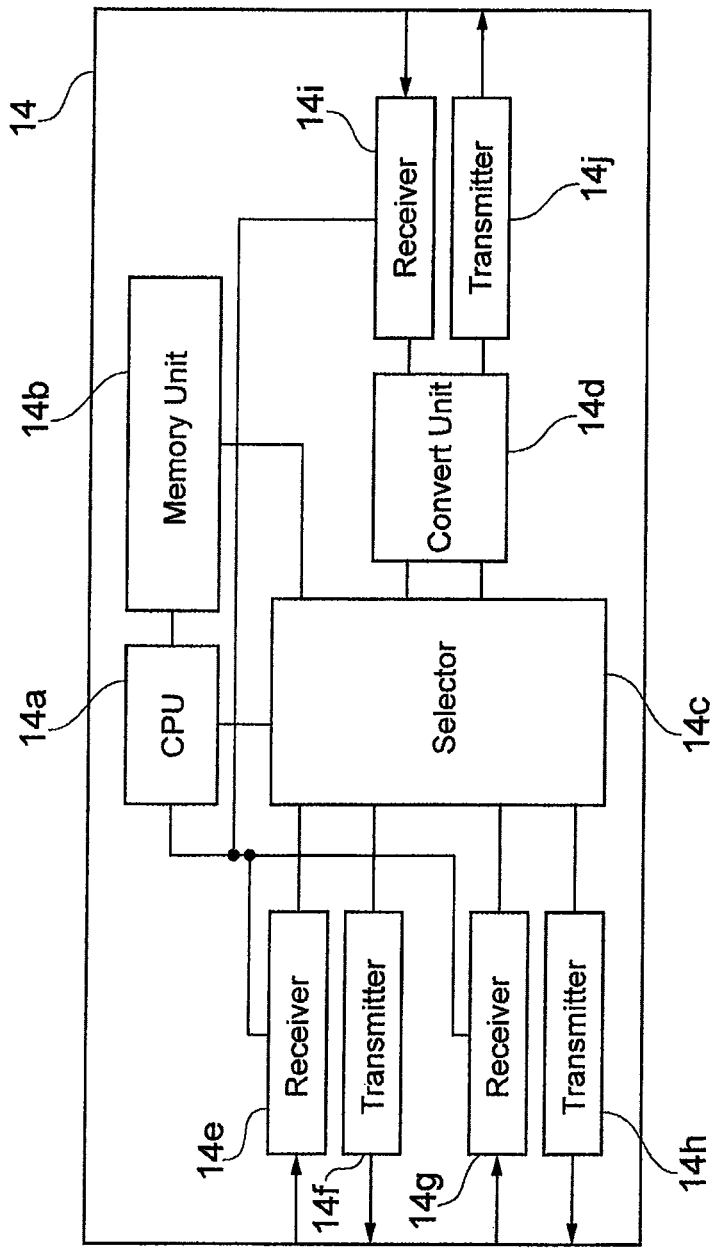
[FIG. 15]

FIG. 15 shows an example of the configuration of a converter 14, which is a variation of the embodiments described above. Although the disk array system 1 described above uses a two-port hard disk drive 111 to provide the redundant configuration, a hard disk drive having one port (hereinafter, called one-port hard disk drive) may be used in order to reduce the cost. In this case, the converter 14 is inserted between the one-port hard disk drive and the disk unit 11 in order to maintain the redundant configuration of the system. This converter 14 functions as a converter for using the one-port hard disk drive instead of the two-port hard disk drive 111.

The converter 14 can be mounted on the disk unit 11, regardless of, for example, the size and shape of the one-port hard disk drive. Although parameter information varies for each hard disk drive, the converter 14 has a sufficient storage area (corresponding to a memory unit 14*b* described below) capable of storing parameter information corresponding to each hard disk drive.

The converter 14 is connected to a one-port hard disk drive so that one converter 14 corresponds to one hard disk drive; and the type of the disk array system 1 to which the converter 14 will be connected is confirmed when the one-port hard disk drive is shipped. Therefore, if appropriate parameter information is stored in the converter 14 in advance depending on the timing of shipment, it is no longer necessary to store any excess parameter information and it is possible to effectively utilize the memory area.

Next, the specific configuration of the converter 14 will be explained. The converter 14 includes a CPU (Central Processing Unit) 14*a*, a memory unit 14*b*, a selector 14*c*, a convert unit 14*d*, first receiver and transmitter 14*e*, 14*f*, second receiver and transmitter 14*g*, 14*h*, and third receiver and transmitter 14*i*, 14*j*. The CPU 14*a* controls the entire converter 14. After receiving a parameter information acquisition request and the parameter setting request mentioned above from the processor 124*a*, the CPU 14*a* provides parameter information prepared in the memory unit 14*b*.

The first receiver and transmitter 14*e*, 14*f* and the second receiver and transmitter 14*g*, 14*h* correspond to the two ports described above. The third receiver and transmitter 14*i*, 14*j* are ports to which an I/O interface of the above-described one-port hard disk drive is connected. The convert unit 14*d* executes protocol conversion. The selector 14*c* has a switching function that selects any of the first receiver and transmitter 14*e*, 14*f* and the second receiver and transmitter 14*g*, 14*h* under the control of the CPU 14*a*.

(5) Advantageous Effects of The Embodiments

As described above, according to the disk array system 1 of the embodiments, particular parameter information including information regarding a specific operation mode suited for operation (for example, a parameter value for a high-speed mode) is stored in advance in the hard disk drive 111 as a targeting object to be added. As triggered by attachment of the hard disk drive 111 to the disk adapters 123*a*, etc., the processor 124*a* provisionally operates the hard disk drive 111 in a low-speed mode based on predetermined parameter information has been prepared in advance, reads the particular parameter information from the hard disk drive 111, and operates the hard disk drive 111 in a high-speed mode based on the particular parameter information.

The disk array system 1 according to the embodiments have the following characteristics. Firstly, the hard disk drive 111 is booted in a low-speed mode at the time of its initial boot so that it can be booted even without using the optimum parameter value. Secondly, the hard disk drive 111 stores particular parameter information including the optimum parameter value in advance. Therefore, the processor 124*a* reads the particular parameter information from the hard disk drive 111. Thirdly, as the processor 124*a* sets, for example, the optimum parameter value contained in the read particular parameter information to the hard disk drive 111 and the expander 130 and changes the operation mode to a high-speed mode, the hard disk drive 111 is operated based on, for example, the optimum parameter value.

With this arrangement, even if an arbitrary hard disk drive 111 is mounted, the disk array system 1 can operate the hard disk drive 111 in the high-speed mode suited for that hard disk drive 111. Therefore, even if an arbitrary hard disk drive 111 that will appear in the future is added, the disk array system 1 can secure the quality of data communication by setting an appropriate parameter value(s) and thereby reducing an error rate even if communication with the hard disk drive 111 is performed in the high-speed mode.

According to the disk array system 1, the disk controller 12 includes: a channel adapter 121*a* serving as an interface with a host computer (not shown); switch devices 122*a*, etc. serving as the first switch units for controlling data transfer between the channel adapter 121*a* and the disk adapter 123*a*; and a memory unit 125*a* in which the predetermined parameter information is stored in advance. The disk unit 11 includes switch devices 13*a*, etc. serving as the second switch units for controlling a disk array constituted from at least one hard disk drive 111 and the hard disk drive 111 described above.

According to the disk array system 1, switch devices 13*a*, etc. include the expander 130 for controlling data transfer from and to each hard disk drive 111.

According to the above disk array system 1, expander 130 includes: a port 131 having a transceiver for performing data communication with hard disk drive 111 connected to each of disk adapters 123*a*, etc.; a switch circuit 132 for controlling data transfer from and to each hard disk drive 111 connected via the port 131; and a control unit 135 for controlling the switch circuit 132. The processors 124*a*, etc. set a parameter value(s) based on the particular parameter information to a transceiver 131*t*, 131*r*.

According to the disk array system 1, the hard disk drive 111 holds information regarding its location in the disk unit 11 as the particular parameter information.

With this arrangement, although the wiring length varies depending on the location where the hard disk drive 111 is placed in the disk unit 11, it is possible to boot and operate the hard disk drive 111 in consideration of the wiring length.

According to the disk array system 1, the hard disk drive 111 has information regarding characteristics, including any of (or a combination of any of) signal amplitude, pre-emphasis, and equalizer, as the particular parameter information.

With this arrangement, it is possible to boot and operate the hard disk drive 111 in an appropriate operation mode in consideration of any of these characteristics.

According to the above disk array system 1, the processors 124a, etc. check if the hard disk drive 111 is supported as the model capable of operating in the specific operation mode, and if not supported the processors 124a, etc. do not read the particular parameter information from the hard disk drive 111. With this arrangement, the processors 124a, etc. can avoid executing useless processing, so that it can allocate resources to another processing.

According to the above disk array system 1, If the processors 124a, etc. of the disk array system 1 reads the particular parameter information from the hard disk drive 111 even once, it stores the read particular parameter information in a specific memory unit.

According to the above disk array system 1, once the processor 124a, etc. of the disk array system 1 reads the particular parameter information from the hard disk drive 111, it overwrites the particular parameter information in the specific memory unit with the read particular parameter information and stores it in the specific memory unit.

With this arrangement, the storage capacity for storing the particular parameters read from the hard disk drive 111 can be reduced.

According to the above disk array system 1, if the particular parameter information corresponding to the hard disk drive 111 has already existed in the specific memory unit, the processors 124a, etc. of the disk array system 1 do not read the particular parameter information from the hard disk drive 111 and use the particular parameter information already stored in the specific memory unit.

With this arrangement, the processor 124a does not read the particular parameter information from the hard disk drive 111 in this case, so that it can allocate the resources to another processing.

An expansion method for a hard disk drive 111 in the disk array system 1 according to the above embodiment includes: an initial boot step executed by the processors 124a, etc., as triggered by attachment of a hard disk drive 111 that has held particular parameter information in advance including information regarding a specific operation mode suited for operation to the disk adapters 123a, etc., for provisionally operating the hard disk drive 111 in a predetermined low-speed mode based on predetermined parameter information has been prepared in advance; an acquisition step executed by the processors 124a, etc. of reading the particular parameter information from the hard disk drive 111 in the predetermined operation mode; and a normal operation step executed by the processors 124a, etc. of operating the hard disk drive 111 in the specific operation (high-speed mode) mode based on the particular parameter information.

(6) Other Embodiments

The above-described embodiments are examples given for the purpose of describing this invention, and it is not intended to limit the invention only to these embodiments. Accordingly, this invention can be utilized in various ways unless the utilizations depart from the gist of the invention. For example, processing sequences of various programs have been explained sequentially in the embodiments described above; however, the order of the processing sequences is not particularly limited to that described above. Therefore, unless any conflicting processing result is obtained, the order of processing may be changed or concurrent operations may be performed.

The invention claimed is:

1. A disk array system coupled to a host computer, comprising:
    a plurality of hard disk drives;
    an expander device including a memory and a plurality of ports, each port coupled to one of the plurality of hard disk drives; and
    a disk controller being coupled to the expander device and controlling data transfer between the host computer and the plurality of hard disk drives via the expander device,
    wherein each of the plurality of hard disk drives stores its own particular parameter information used for communication with the expander,
    wherein, when the disk controller begins communication between the disk controller and a first disk drive coupled to a first port of the plurality of ports of the expander via the expander, the disk controller is configured to:
    read first particular parameter information, which comprises a plurality of parameter values being suited for the communication between the expander and the first disk drive regarding an attribute of the first disk drive, from the first disk drive via the expander;
    specify a first particular parameter value, which is suitable for the communication between the expander and the first disk drive based on a location to which the first disk drive is mounted from among the plurality of parameter values of the first particular parameter information; and
    set the first particular parameter value on a memory of the first port of the expander and on the first disk drive so that the expander and the first disk drive can optimize a status of communication between the expander and the first disk drive based on the first particular parameter value,
    wherein the first disk drive is capable of changing operating modes,
    wherein before the first particular parameter value is set on the memory of the first port of the expander and on the first disk drive, the first disk drive is operated in a first operation mode in which the first disk drive communicates with the expander at a first speed rate, and
    wherein after the first particular parameter value is set on the memory of the first port of the expander and on the first disk drive, the first disk drive is operated in a second operation mode in which the first disk drive communicates with expander at a second speed rate which is faster than the first speed rate.

2. A disk array system according to claim 1,
    wherein, when the disk controller begins communication between the disk controller and a second disk drive coupled to a second port of the plurality of ports of the expander via the expander, the disk controller is configured to:
    read second particular parameter information, which comprises a plurality of parameter values being suited for the communication between the expander and the second disk drive regarding an attribute of the second disk drive, from the second disk drive via the expander;
    specify a second particular parameter value, which is suitable for the communication between the expander and the second disk drive based on a location to which the second disk drive is mounted, from among the plurality of parameter values of the second particular parameter information; and set the second particular parameter value on a memory of the second port of the expander and on the second disk drive so that the expander and the second disk drive can optimize a status of communication signal between the expander and the second disk drive based on the second particular parameter value.

3. A disk array system according to claim 2,
wherein a length of a path for a communication between the expander and the first disk drive is different from a length of a path for a communication between the expander and the second disk drive.

4. A disk array system according to claim 2,
wherein the attribute of the first disk drive is different from the attribute of the second disk drive.

5. A method performed by a disk array controller in a disk array system coupled to a host computer, the disk array system having:
a plurality of hard disk drives;
an expander device including a memory and a plurality of ports, each port coupled to one of the plurality of hard disk drives; and
the disk controller being coupled to the expander device and controlling data transfer between the host computer and the plurality of hard disk drives via the expander device, wherein each of the plurality of hard disk drives stores its own particular parameter information used for communication with the expander, and wherein, when the disk controller begins communication between the disk controller and a first disk drive coupled to a first port of the plurality of ports of the expander via the expander, the method comprising the steps of:
reading first particular parameter information, which comprises a plurality of parameter values being suited for the communication between the expander and the first disk drive regarding an attribute of the first disk drive, from the first disk drive via the expander;
specifying a first particular parameter value, which is suitable for the communication between the expander and the first disk drive based on a location to which the first disk drive is mounted, from among the plurality of parameter values of the first particular parameter information; and
setting the first particular parameter value on a memory of the first port of the expander and on the first disk drive so that the expander and the first disk drive can optimize a status of communication between the expander and the first disk drive based on the first particular parameter value,
wherein the first disk drive is capable of changing operating modes,
wherein before the first particular parameter value is set on the memory of the first port of the expander and on the first disk drive, the first disk drive is operated in a first operation mode in which the first disk drive communicates with the expander at a first speed rate, and
wherein after the first particular parameter value is set on the memory of the first port of the expander and on the first disk drive, the first disk drive is operated in a second operation mode in which the first disk drive communicates with the expander at a second speed rate which is faster than the first speed rate.

6. A method according to claim 5, wherein, when the disk controller begins communication between the disk controller and a second disk drive coupled to a second port of the plurality of ports of the expander via the expander, the method further comprising the steps of:
reading second particular parameter information, which comprises a plurality of parameter values being suited for the communication between the expander and the second disk drive regarding an attribute of the second disk drive, from the second disk drive via the expander;
specifying a second particular parameter value, which is suitable for the communication between the expander and the second disk drive based on a location to which the second disk drive is mounted, from among the plurality of parameter values of the second particular parameter information; and
setting the second particular parameter value on a memory of the second port of the expander and on the second disk drive so that the expander and the second disk drive can optimize a status of communication signal between the expander and the second disk drive based on the second particular parameter value.

7. A method according to claim 6,
wherein a length of a path for a communication between the expander and the first disk drive is different from a length of a path for a communication between the expander and the second disk drive.

8. A method according to claim 6,
wherein the attribute of the first disk drive is different from the attribute of the second disk drive.

* * * * *